US008687207B2

(12) United States Patent
Berti et al.

(10) Patent No.: US 8,687,207 B2
(45) Date of Patent: Apr. 1, 2014

(54) METHOD AND DEVICE FOR OPTIMIZING A JOB CHANGE

(75) Inventors: Christopher Berti, Dielheim (DE); Bernhard Buck, Heidelberg (DE); Holger Faulhammer, Stuttgart (DE); Michael Krueger, Edingen-Neckarhausen (DE); Juergen Maass, Wiesloch (DE); Sven Mader, Dielheim (DE); Stefan Maier, Bad Schoenborn (DE); Kai Oskar Mueller, Birkenau (DE); Matthias Noell, Weiterstadt (DE); Martin Riese, Radebeul (DE); Bernhard Roskosch, Wiesloch (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 2461 days.

(21) Appl. No.: 10/661,263

(22) Filed: Sep. 12, 2003

(65) Prior Publication Data

US 2004/0090645 A1 May 13, 2004

(30) Foreign Application Priority Data

Sep. 13, 2002 (DE) .................................. 102 42 548

(51) Int. Cl.
*G06F 3/12* (2006.01)
*G06K 15/22* (2006.01)

(52) U.S. Cl.
USPC ............. 358/1.13; 358/1.1; 358/1.9; 358/1.4; 358/406; 358/504; 101/425; 101/485; 101/350.5

(58) Field of Classification Search
USPC .................. 358/1.9, 1.11–1.18, 2.1; 718/102; 101/484, 483, 350, 492, 425, 350.1, 101/148; 400/53, 55, 701, 702, 702.1; 347/5–7, 22–36; 399/34, 35, 123, 326, 399/327, 343; 355/85
See application file for complete search history.

(56) References Cited

U.S. PATENT DOCUMENTS

| | | | | | |
|---|---|---|---|---|---|
| 4,572,652 | A | * | 2/1986 | Tada et al. | 399/81 |
| 5,010,820 | A | * | 4/1991 | Loffler | 101/484 |
| 5,174,210 | A | * | 12/1992 | Rodi et al. | 101/492 |
| 5,447,102 | A | * | 9/1995 | Pfeiffer et al. | 101/492 |
| 5,467,436 | A | * | 11/1995 | Rodi et al. | 358/1.15 |
| 5,699,494 | A | * | 12/1997 | Colbert et al. | 358/1.15 |
| 5,727,135 | A | * | 3/1998 | Webb et al. | 358/1.14 |
| 5,930,468 | A | * | 7/1999 | Zingher et al. | 358/1.16 |

(Continued)

FOREIGN PATENT DOCUMENTS

DE 19631469 2/1998

*Primary Examiner* — Chad Dickerson
(74) *Attorney, Agent, or Firm* — Davidson, Davidson & Kappel, LLC

(57) ABSTRACT

A method for determining the optimum procedure for a job change on a printing-material processing machine (10) with at least one control computer. The data of a first machine job is compared to the data of a subsequent machine job using a control computer, and the comparison is used to establish an order of the operations to be carried out during the job change. Also provided is a device for determining the optimum procedure for a job change on a printing-material processing machine (10) with at least one control computer. The control computer is intended to compare the data of a first machine job to the data of a subsequent machine job, and to use the comparison to establish an order of the operations to be carried out during the job change.

25 Claims, 2 Drawing Sheets

(56) References Cited

U.S. PATENT DOCUMENTS

| | | | | |
|---|---|---|---|---|
| 6,359,698 | B1 * | 3/2002 | Kawaguchi | 358/1.16 |
| 6,545,766 | B1 * | 4/2003 | Shima et al. | 358/1.14 |
| 6,587,126 | B1 * | 7/2003 | Wakai et al. | 715/744 |
| 6,615,725 | B2 * | 9/2003 | Kurata et al. | 101/483 |
| 6,655,285 | B2 * | 12/2003 | Nagano et al. | 101/484 |
| 6,748,858 | B2 * | 6/2004 | Yamaguchi | 101/232 |
| 6,984,800 | B2 * | 1/2006 | Abe et al. | 219/69.12 |
| 6,999,070 | B2 * | 2/2006 | Jeyachandran et al. | 345/419 |
| 7,064,848 | B2 * | 6/2006 | Jackson et al. | 358/1.13 |
| 2001/0039461 | A1 * | 11/2001 | Bauer | 700/17 |
| 2001/0042482 | A1 * | 11/2001 | Kurata et al. | 101/483 |
| 2002/0151320 | A1 * | 10/2002 | Wasenius | 455/518 |
| 2003/0011792 | A1 * | 1/2003 | Noyes et al. | 358/1.4 |
| 2003/0011805 | A1 * | 1/2003 | Yacoub | 358/1.15 |
| 2003/0149747 | A1 * | 8/2003 | Rai et al. | 709/219 |
| 2003/0161292 | A1 * | 8/2003 | Silvester | 370/349 |

* cited by examiner

METHOD AND DEVICE FOR OPTIMIZING A JOB CHANGE

Priority to German Patent Application No. 102 42 548.5, filed Sep. 13, 2002 and hereby incorporated by reference herein, is claimed.

BACKGROUND INFORMATION

The present invention relates to a method and a device for determining the optimum procedure for a job change on a printing-material processing machine with at least one control computer.

Unlike web-fed rotary printing presses used in newspaper applications, in the case of sheet-fed offset printing presses, print jobs are changed relatively frequently. In this case, it is necessary to replace the printing plates on the plate cylinders and often also to change the printing inks. This involves a number of further operations, including, for example, washing of cylinders in the printing press. Some of these operations during a job change take place concurrently; others have to be carried out consecutively so that the manner in which the operations during the job change are organized is of considerable importance.

In conventional printing presses, the order of operations during a job change is fixed so that the operating personnel have no possibility to change this order, but have to follow the procedure determined by the printing press. However, fixed procedures during the job change inevitably lead to approximately identical set-up and downtimes when changing between two print jobs, independently of which operations are actually required for the particular job change. German Patent No. DE 196 31 469 C1, related to U.S. Pat. No. 5,930,468 which is hereby incorporated by reference herein, describes a method which is intended to optimize and minimize the set-up and downtimes for several changes between several consecutive print jobs. To this end, the method uses a data processing system that controls a printing press so as to bring the pending print jobs into such an order that the set-up and downtimes during the print job changes to be carried out will be as short as possible. To this end, the image contents of different print jobs are compared image element by image element as well as their respective color separations, making it possible to predict the operations for making printing forms and to establish the order of print jobs on the basis of the totality of operations. Thus, it is known from German Patent No. DE 196 31 469 to calculate the order of print jobs in a manner allowing the print jobs, including print jobs changes, to be carried out in as short an overall time as possible. However, the procedure known from the prior art mentioned in the previous section is only successful if a certain number of print jobs is known in advance so that they can be brought into a specific optimum order. According to the prior art, however, a single change between two print jobs cannot be optimized.

SUMMARY OF THE INVENTION

It is an object of the present invention to optimize the job change itself between two successive print jobs.

The method and device according to the present invention are capable of comparing the data of a first machine job to the data of a subsequent machine job using a control computer and to use this comparison to establish an order of the operations to be carried out during the job change. This method and device can be used in all printing-material processing machines of the graphics industry. Thus, the present invention is not limited to only printing presses, but can also be used, for example, for folding machines when different folding jobs are to be carried out. It is a feature of the method and device that the order of the operations to be carried out during a job change is no longer fixed as in the prior art, but is established as a function of the machine job currently in progress and of the subsequent machine job. Each machine job in the graphics industry is associated with a specific data set containing all machine settings required for the printing process and subsequent finishing processes. In this context, the data for the adjustment has to be entered either manually by the operating personnel of the particular machine, or is automatically communicated to the machine via suitable electronic information systems. However, when a change in print job is to be carried out, some adjustments and maintenance operations, such as changing the printing ink, have to be done by the operating personnel even in the case of machines that are provided with electronic information systems. To this end, according to the present invention, a particularly favorable order of the operations to be carried out during the job change is established using the control computer and the data of the print jobs and communicated to the operating personnel as required. Thus, there is no need for the operating personnel to follow rigid procedures as in the prior art, or to think themselves about the best order in which to carry out the required operations.

In a first embodiment of the present invention, provision is made to calculate the order of operations to be carried out during a job change in such a manner that the set-up time or downtime during the job change will be minimal. In this manner, it is ensured that the machine downtime between two successive print jobs is limited to a minimum. Since especially in the case of sheet-fed offset printing presses the print jobs have to be changed more frequently, the efficiency of the machines available in a printing plant can thus be significantly increased. For this purpose, it is sufficient to know the data of two successive print jobs, it being unimportant whether the data of the second machine job is already known prior to carrying out the first machine job, because the data of the second machine job can still be entered or transferred while the first job is being processed. The data of the second machine job only have to be communicated in the control computer by the end of the first job to avoid unnecessary downtime. Thus, this embodiment allows the set-up time or downtime during a job change to be minimized without the aid of the operating personnel only on the basis of the machine jobs to be processed.

In a further embodiment of the present invention, the number of operating personnel of the printing-material processing machine is also taken into account in the calculation of the optimum operating procedures during a job change. The number of operating personnel working at a printing press is of considerable importance for the order of processes during a job change. For example, if only one person is available to carry out the job change, then the order of operations during a job change must be so calculated as to avoid that two operations have to be carried out simultaneously. The more operating personnel are available, the more operations can be carried out in parallel. The number of available operating personnel must, of course, be communicated to the control computer by entering the required data. This embodiment of the present invention ensures, on the one hand, that the order of operations to be carried out during a job change is always calculated such that the operations can be carried out by the operating personnel and, on the other hand, that the set-up and downtime is reduced to the extent permitted by the number of operating personnel.

Moreover, it is proposed that the length of the paths to be traveled by the operating personnel of the printing-material processing machine while carrying out the order of processes be taken into account in the calculation of the optimum operating procedures during a job change. Especially in the case of long printing presses having, for example, ten or more printing units, it is thereby possible for the operating procedures during a job change to be organized in such a manner that the paths traveled by the operating personnel are as short as possible and that the operating personnel are always there when a manual intervention in the control of the printing press is required. Thus, the set-up and downtime during a job change can be effectively reduced.

If the calculated order of processes is visually displayed to the operating personnel for carrying out the job change, then this has the advantage that the operating personnel can always ascertain which operation is to be carried out next. Moreover, the operating personnel can be directed to the specific locations on the machine where manual interventions in the process are required.

In a further embodiment of the present invention, it is therefore proposed to guide the operating personnel through the individual steps of the calculated order of processes via one or more display devices mounted on the printing-material processing machine. Using such a display device, which is advantageously designed as a CRT or LCD type screen, the particular operations to be carried out can be visualized to the operating personnel in an optimum manner. Since the display devices are mounted on the printing-material processing machine, the operating personnel have the order of processes to be carried out directly in front of them while carrying out the particular operations during a job change, without, for example, having to go to the control console of a printing press. It may be further advantageous if not only one but several display devices are mounted on such a printing-material processing machine so that the operating personnel can always see at least one display device informing them of the required operations, regardless of the location of the machine where the operating personnel is located. Thus, for example, it is possible to provide each printing unit of a printing press with such a display device so that at least one display device is in the field of vision of the operating personnel, independently of which printing unit they are working at. Moreover, the display devices can be used to direct the operating personnel from one location on the printing press to a different location where a manual intervention in the process is required. Thus, operating personnel are not only guided through the correct order of operations, but also to the locations of the operations on the printing press in a manner similar to a navigation system.

As an alternative or complement to the previous embodiment of the present invention, it is proposed that the calculated order of processes be communicated to the operating personnel in acoustic form. In this case, the display device on the machine can be dispensed with, resulting in cost savings since an acoustic communication, for example, via a loudspeaker is the more cost-effective alternative, especially compared to several display devices. Moreover, acoustic communication of operations to the operating personnel offers the advantage that, visually, the operating personnel can concentrate exclusively on the operations to be carried out without having to glance at display devices in between.

In a further embodiment of the present invention, provision is made for the system for acoustic communication to be composed of at least one headset that is wirelessly connected to the control computer of the printing-material processing machine. Since there is frequently a considerable level of noise in the area around printing presses and folding machines, acoustic information about the order of processes during a job change is relatively difficult to make understandable to the operating personnel. Therefore, it is advantageous if the acoustic information is communicated to the operating personnel via a headset. However, since a printing press has a relatively large spatial extent, the headset must not hinder the operating personnel in moving around the printing press or during the operations to be carried out. For this reason, it is useful if the headset communicates wirelessly with the control computer, thus effectively avoiding hindrance of the operating personnel. Due to the wireless connection, the operating personnel are, in particular, not restricted in their freedom of movement and are able to work also on other printing presses until new acoustic information about carrying out an operation is communicated via the headset. At the same time, the headset also acts as noise protection for the operating personnel.

In another embodiment of the present invention, the display device is intended to indicate supporting information or faults. During a job change, the display devices provided on a printing-material processing machine can be used not only to display the order of operations, but also to display possible faults as well as supporting information about the particular operations to be carried out. If the operating personnel have difficulties in carrying out an operation, they can get appropriate support by selecting supporting information on the display device, which is designed, for example, as a touch screen. Of course, the fault messages and supporting information can additionally or alternatively be communicated to the operating personnel also in acoustic form using the means mentioned above.

Further advantages are offered by an embodiment of the present invention in which the printing-material processing machine has at least one main drive for driving the printing cylinders and plate cylinders or coating blanket cylinder as well as separately driven inking units and inking rollers that can be turned off. In order to be able to vary the order of processes during a job change at all, at least some components of a printing press should be able to be moved and positioned independently of each other. Otherwise it is very difficult to carry out processes in parallel. For this purpose, it is useful if at least printing units and inking rollers can be moved independently of the main drive of the printing press. The greater the number of independently drivable components or individual drives provided on a printing press or folding machine, the more flexible is the handling of the order of operations during a job change and, in particular, the greater is the number of processes that can take place in parallel. In this respect, a printing press in which all cylinders have individual drives is the optimum, because here the processes during the job change on a printing press can be controlled in a particularly flexible manner.

BRIEF DESCRIPTION OF THE DRAWINGS

Further advantageous embodiments of the present invention will be apparent from the drawings. The present invention will also be explained and described in more detail below with reference to the drawings, in which.

DETAILED DESCRIPTION

Figure 1:
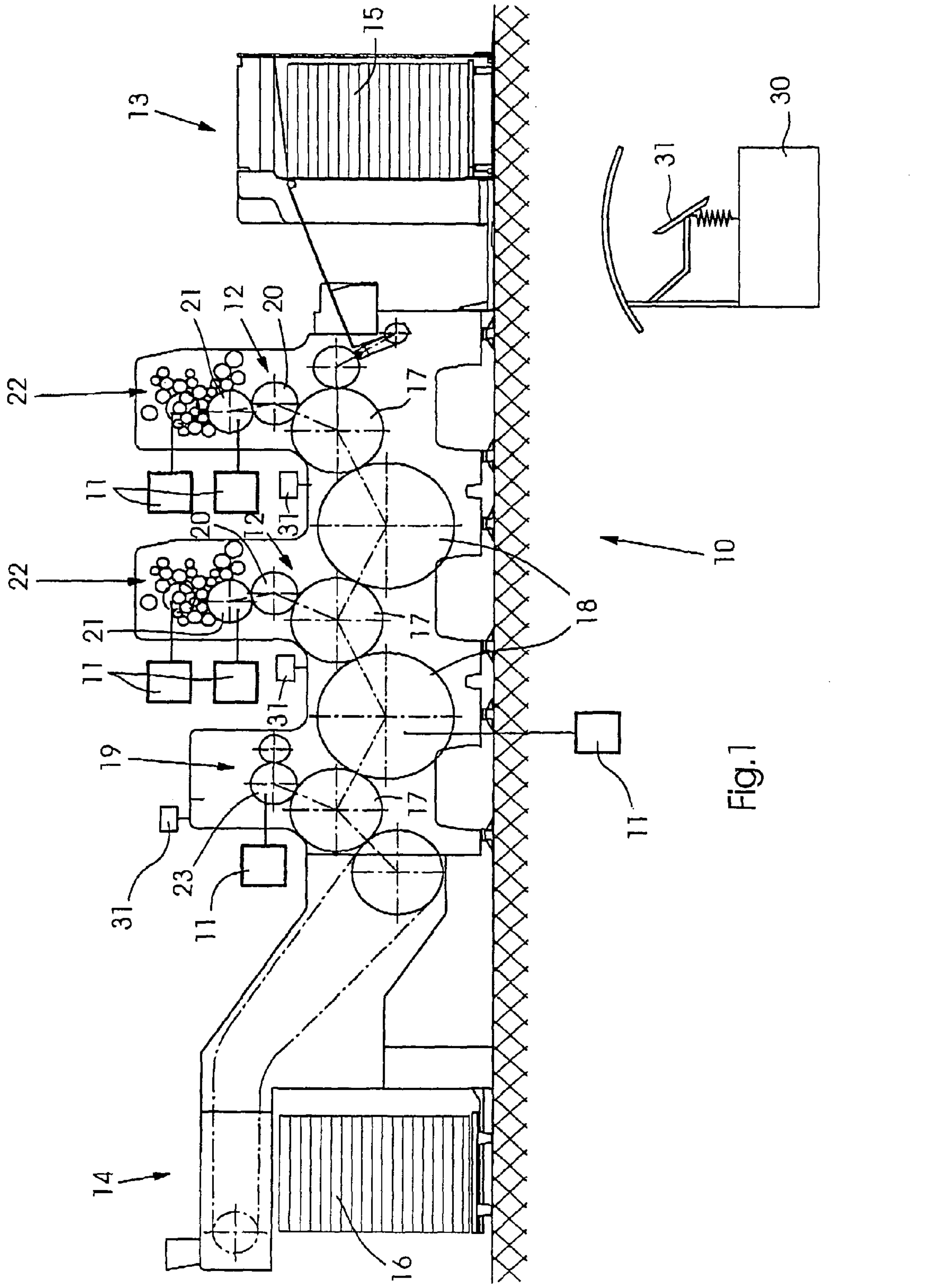
FIG. 1 shows a printing press that includes two printing units and a coating unit as well as a feeder and a delivery and is equipped with display devices for carrying out a job change according to the present invention.

FIG. 1 depicts a printing press 10 that is suitable for carrying out the method according to the present invention and has a device according to the present invention. In this context, printing press 10 includes a feeder 13, which feeds sheet stock located on a feeder pile 15 to a printing unit 12. The printing press shown in FIG. 1 has a total of two printing units 12 as well as a coating unit 19 arranged downstream in the direction of sheet travel. Adjacent to coating unit 19 is a delivery 14, which places the printed and coated sheet stock on a delivery pile 16. According to the exemplary embodiment in FIG. 1, the two printing units 12 of printing press 10 are substantially identical in design, but this is not a requirement of the present invention and therefore does not limit it to identically designed printing units 12 either. In this context, each of printing units 12 has an inking unit 22 in the upper region, the inking unit having a separate drive motor 11. Thus, inking units 22 can be driven independently of all other moving mechanisms of printing press 10. Printing units 22 each transfer their ink to a plate cylinder 21 which carries the printing plate or printing form. According to the principle of offset printing, the ink adhering to plate cylinder 21 is transferred to an offset printing cylinder 20, mainly a blanket cylinder, which then prints on a printing material that is passed through between offset printing cylinder 20 and an associated impression cylinder 17.

Using the transport cylinders 18 located between impression cylinders 17, the printing materials are transported from one printing unit 12 to the next and to coating unit 19. According to FIG. 1, plate cylinders 21 also have a separate drive motor 11. Coating blanket cylinder 23 in coating unit 19 is also provided with an electric drive motor and therefore can also be driven separately, independently of all other cylinders. Besides, impression cylinders 17, transport cylinders 18, as well as offset printing cylinders 20 of printing units 12 are connected to the drive motor 11 of a main drive via a gear train. Plate cylinders 21, which have a separate drive motor, and coating blanket cylinder 23 are designed in such a manner that they can also be coupled to the gear train. To this end, they can be engaged with the gear train via a coupling.

Printing press 10 according to FIG. 1 also has a control console 30 which is provided with a monitor 31 through which the operating personnel can make all the adjustments required to operate printing press 10. Moreover, control console 30 of the printing press contains a control computer into which can be entered or in which is already stored the data of the machine jobs or print jobs that is used as the basis for calculating the operating procedures during a job change between two print jobs. The order of processes calculated in this manner is visually displayed to the operating personnel of printing press 10 on further monitors 31 that are mounted on printing press 10 as display devices for this purpose. Since a monitor 31 is provided on each printing unit 12 and on coating unit 19, where most of the processes during a job change have to be carried out, the operating personnel can be suitably supported on-site by an order of processes displayed on monitors 31.

The use of several drive motors 11 for separately driving cylinders and inking unit 22 in printing press 10 serves to increase flexibility with respect to the order of processes during a job change. In this case, many components of printing press 10 can be adjusted concurrently, because each component is driven by a separate drive motor 11 and can therefore be positioned independently of other components. In this manner, the adjustment procedures during a job change can be carried out simultaneously and independently of each other, allowing a reduction in set-up and downtime during the job change by carrying out the adjustment procedures simultaneously. To be able to calculate the order of processes during a job change in an optimum manner, the control computer is provided with the possibility of querying the number of operating personnel and their qualification. Thus, when a job change needs to be carried out, the optimum order of processes for the particular constellation can be calculated as a function of the number of operating personnel and their qualification.

Figure 2:
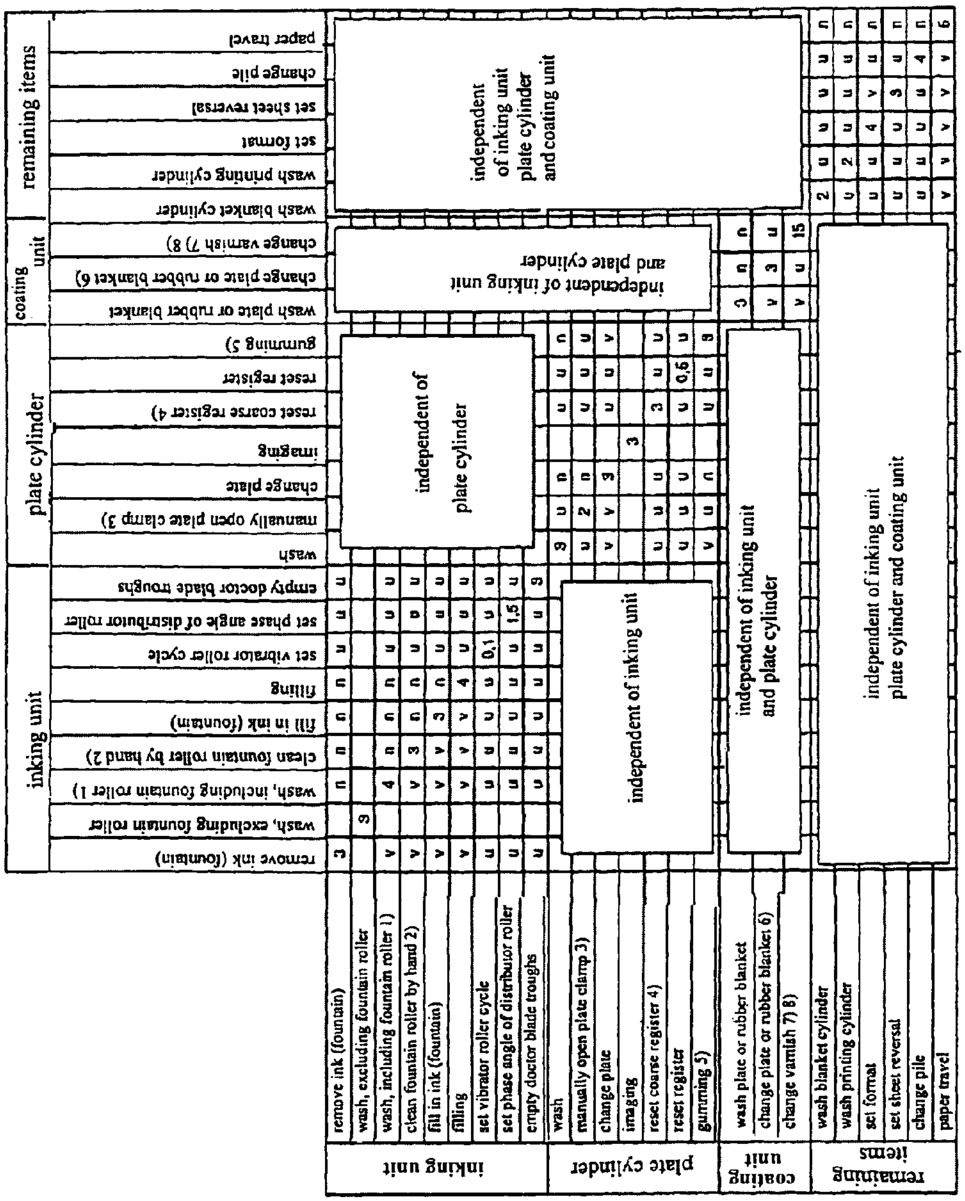
FIG. 2 shows a table containing operations to be carried out during a job change, along with their respective process priorities.

FIG. 2 shows a table of processes which usually have to be carried out during a job change. In this context, the specific time required for a particular process is specified in minutes in the main diagonal of the matrix table. Besides, the table contains relationships between the individual processes, showing in each case which process needs to be carried out earlier "V", which process needs to be carried out later "N", and which process is temporally independent "U" of other processes. Thus, the dependencies among the processes as well as their duration are shown in a clear manner. The table also contains large rectangular boxes, which also stand for the independence "U" of processes that are in a relation to each other.

At certain processes in the table according to FIG. 2 there is a footnote indicating special cases. For example, at 1) it is noted that it is necessary to wash the fountain roller when changing the ink, in case of heavy contamination of the ink in the fountain, and when the machine is stopped, for example, for a longer shutdown over the weekend. Footnote 2) indicates additional work that is only required in the case of heavy contamination. Conversely, the work according to footnote 3) is always done when a plate has been stretched or spread on a plate cylinder 21. Footnote 4) indicates additional work that is required during coarse register adjustment and associated adjustments. According to footnote 5), the plate of plate cylinder 21 must be protected from changes in the surface when printing press 10 is not used for a longer period of time. Footnote 6) indicates that the plate or rubber blanket of coating unit 19 only needs to be changed if the coating is not applied over the whole surface. Footnote 7) also relates to work on coating unit 19, which takes about 10-15 minutes and includes pumping out the varnish, circulating the water, cleaning the pan, as well as cleaning the pan roller or metering roller. When coating with a chambered doctor blade, additional work according to footnote 8) is required which differs from the previous work on coating unit 19 under footnote 7) by the cleaning and removal of the chambered doctor blade.

The table shown in FIG. 2 represents only a portion of a table used in reality, since in reality it is necessary to cover far more complex processes. It is, of course, also possible to correlate the processes using a different form of representation. However, the tabular form is considered particularly suitable, because it is also easy to implement in the control computer. All data stored in the control computer in this manner is used for calculating the order of processes during a job change and therefore ensure an optimally short set-up time. Moreover, in the event of faults or when an increased time requirement arises for certain operations, the control computer can recalculate the previously calculated order of the job change. For example, if a plate has been punched incorrectly, then the control computer calculates a new optimum order, taking into account the replacement of this incorrectly punched plate.

In addition to the possibility shown in FIG. 1 of displaying the order of processes to the operating personnel via monitors 31, it is also possible to chose voice-assisted operator guidance by which the processes to be carried out consecutively are audibly announced to the operating personnel. Since there is usually a high level of noise in the area around printing presses 10, it is useful to transmit acoustic information to the operating personnel via headsets that communicate with the control computer of printing press 10. In order not to restrict the operating personnel in their freedom of movement, preferably, the operating personnel are to be provided with headsets that are wirelessly connected to the control computer of printing press 10.

What is claimed is:

1. A method for determining an optimum procedure for a job change between a first machine job and a subsequent machine job on a printing-material processing machine having at least one control computer, the method comprising:

comparing first data of the first machine job to second data of the subsequent machine job using the at least one control computer, and establishing an order of adjustments and maintenance operations to be carried out during the job change between the first machine job and the subsequent machine job as a function of the comparing step;

wherein the adjustments and maintenance operations to be carried out during the job change are performed on at least two different components of the printing press to prepare the at least two components for printing the subsequent machine job.

2. The method as recited in claim 1 wherein the order of the adjustments and maintenance operations to be carried out during the job change is calculated in such a manner that a set-up time or a downtime during the job change is minimized.

3. The method as recited in claim 1 wherein a number of operating personnel of the printing-material processing machine is taken into account in the establishing an order of adjustment and maintenance operations.

4. The method as recited in claim 1 wherein a length of paths to be traveled by operating personnel of the printing-material processing machine while carrying out the adjustment and maintenance operations is taken into account in the establishing an order of adjustment and maintenance operations.

5. The method as recited in claim 1 further comprising visually displaying the established order of adjustment and maintenance operations to operating personnel.

6. The method as recited in claim 5 wherein the operating personnel are guided through individual steps of a calculated order of processes via one or more display devices mounted on the printing-material processing machine.

7. The method as recited in claim 1 wherein the established order of processes is communicated to operating personnel in acoustic form.

8. A device for determining an optimum procedure for a job change on a printing-material processing machine comprising:

at least one control computer comparing first data of a first machine job to second data of a subsequent machine job, and executing program steps as a function of the comparing step to establish an order of operations to be carried out during the job change;

wherein the operations to be carried out during the job change are performed on at least two different components of the printing press to prepare the at least two components for printing the subsequent machine job.

9. The device as recited in claim 8 further comprising one or more display devices for displaying the order of operations.

10. The device as recited in claim 8 further comprising a system for acoustic communication of the established order of operations to operating personnel.

11. The device as recited in claim 10 wherein the system for acoustic communication includes at least one headset wirelessly connected to the control computer.

12. The device as recited in claim 1 further comprising a display device or a system for acoustic communication for communicating information or errors.

13. A printing press comprising:

a device for determining an optimum procedure for a job change between a first machine job and a subsequent machine job on a printing-material processing machine, the device including at least one control computer comparing first data of the first machine job to second data of the subsequent machine job, and executing program steps as a function of the comparing step to establish an order of adjustments and maintenance operations to be carried out during the job change between the first machine job and the subsequent machine job;

wherein the adjustments and maintenance operations to be carried out during the job change are performed on at least two different components of the printing press to prepare the at least two components for printing the subsequent machine job.

14. The printing press as recited in claim 13 further comprising at least one main drive for driving printing cylinders and plate cylinders or a blanket cylinder as well as separately driven inking units and inking rollers that can be turned off.

15. The printing press as recited in claim 13 further comprising individual drives for driving cylinders or additional driven components.

16. The method as recited in claim 1 wherein the establishing step includes accessing a table containing durations of the adjustments and maintenance operations.

17. The method as recited in claim 1 wherein the establishing of the order of the adjustments and maintenance operations is based solely on the comparing of the first data to the second data.

18. The method as recited in claim 1 wherein the establishing step includes determining if a first of the adjustments and maintenance operations should occur prior to a second of the adjustments and maintenance operations.

19. The method as recited in claim 1 wherein the establishing step includes identifying adjustments and maintenance operations to be carried out during the job change between the first machine job and the subsequent machine job and then determining when the adjustments and maintenance operations are to be carried out with respect to one another during the job change as a function of the comparing step.

20. The method as recited in claim 1 wherein the establishing step includes determining which steps can be performed concurrently and which steps must be performed consecutively.

21. The method as recited in claim 3 wherein the order of adjustments and maintenance operations depends on the number of operating personnel of the printing-material processing machine in such a manner that an increased number of operating personnel results in an increased number of steps being performed concurrently.

22. The method as recited in claim 1 wherein a first component of the at least two components is an inking unit and a second component of the at least two components is a plate cylinder.

23. The method as recited in claim 1 wherein one of the at least two components is an offset printing cylinder.

24. The method as recited in claim 1 wherein one of the at least two components is a coating unit.

25. The method as recited in claim 1 wherein a first component of the at least two components and a second component of the at least two components are driven independently of one another.

* * * * *